United States Patent [19]

Burba et al.

[11] Patent Number: 4,928,227
[45] Date of Patent: May 22, 1990

[54] METHOD FOR CONTROLLING A MOTOR VEHICLE POWERTRAIN

[75] Inventors: Joseph C. Burba; Ronald G. Landman, both of Ypsilanti; Prabhakar B. Patil, Detroit; Graydon A. Reitz, Farmington Hills, all of Mich.

[73] Assignee: Ford Motor Company, Dearborn, Mich.

[21] Appl. No.: 115,799

[22] Filed: Nov. 2, 1987

[51] Int. Cl.$^5$ .................. G05D 17/02; B60K 41/18; B60L 7/20

[52] U.S. Cl. .................. 364/424.01; 180/65.3; 318/12; 364/424.1

[58] Field of Search .................. 364/424.1; 74/866; 192/0.042, 0.044, 0.048, 0.052, 0.072, 0.092, 0.062; 369/424.01; 318/12; 180/65.3

[56] References Cited

U.S. PATENT DOCUMENTS

| | | | |
|---|---|---|---|
| 4,095,665 | 6/1978 | Armfield | 180/65.3 |
| 4,418,777 | 12/1983 | Stockton | 180/65.6 |
| 4,419,610 | 12/1983 | Pollman | 318/12 |
| 4,597,463 | 7/1986 | Barnard | 180/65.3 |
| 4,598,374 | 7/1986 | Klatt | 364/424.1 |
| 4,643,048 | 2/1987 | Hattori et al. | 192/0.044 |
| 4,648,290 | 3/1987 | Dunkley et al. | 364/424.1 |
| 4,688,450 | 8/1987 | Hayashi et al. | 364/424.1 |
| 4,718,309 | 1/1988 | Moriya | 74/866 |

Primary Examiner—Felix D. Gruber
Attorney, Agent, or Firm—Frank G. McKenzie; Donald J. Harrington

[57] ABSTRACT

A multiple forward speed automatic transmission produces its lowest forward speed ratio when a hydraulic clutch and hydraulic brake are disengaged and a one-way clutch connects a ring gear to the transmission casing. Second forward speed ratio results when the hydraulic clutch is engaged to connect the ring gear to the planetary carrier of a second gear set. Reverse drive and regenerative operation result when an hydraulic brake fixes the planetary and the direction of power flow is reversed. Various sensors produce signals representing the position of the gear selector lever operated manually by the vehicle operator, the speed of the power source, the state of the ignition key, and the rate of release of an accelerator pedal. A control algorithm produces input data representing a commanded upshift, a commanded downshift and a torque command and various constant torque signals. A microprocessor processes the input and produces a response to them in accordance with the execution of a control algorithm. Output or response signals cause selective engagement and disengagement of the clutch and brake to produce the forward drive, reverse and regenerative operation of the transmission.

14 Claims, 5 Drawing Sheets

FIG.4B

KEY OF TERMS

| | |
|---|---|
| KST | = KEY IN START POSITION |
| P,R,N,D,L | = LEVER POSITIONS |
| TQC | = TORQUE COMMAND |
| MS | = POWER SOURCE SPEED |
| FDE$C$ | = RATE OF ACCELERATOR PEDAL RELEASE |
| W | = CONSTANT (SMALL POSITIVE TORQUE) |
| DS | = DOWNSHIFT SCHEDULE |
| US | = UPSTART SCHEDULE |
| DEL 1,2 | = TIME DELAY |
| + | = LOGICAL "OR" |
| PC | = PRECHARGE |
| En | = ENABLE |
| PD | = POWER DOWN |
| Ft | = FAULT |
| CM | = CLOSE MAIN CONTRACTOR |
| 1 G | = ONE WAY CLUTCH |
| 2 G | = SECOND GEAR CLUTCH |
| 1 R | = FIRST GEAR REGEN |
| 2G | = SECOND GEAR CLUTCH |
| RR | = REVERSE REGEN |
| 2R | = SECOND GEAR REGEN |

METHOD FOR CONTROLLING A MOTOR VEHICLE POWERTRAIN

The U.S. government has rights in this invention pursuant to contract #DE-AC07-85NV-10418 awarded by the U.S. Department of Energy.

BACKGROUND OF THE INVENTION

1. Field of the Invention

This invention relates to a control system and strategy for controlling the torque produced by a vehicle powertrain consisting of a power source and a transmission to accelerate and brake the vehicle in both forward and reverse directions in accordance with driver demands as expressed through the manipulation of accelerator and brake pedals and a shift lever. The control system regulates the torque delivered to the wheels of the vehicle by controlling the torque produced by the power source, which could be an electric motor or an internal combustion engine, and the gear ratio in the automatic transmission. More particularly, the invention relates to a system for controlling the clutches in an automatic transmission and the torque command issued to a power source torque controller.

2. Description of the Prior Art

Conventional electronic controls for motor vehicle powertrains employ control algorithms whose execution by an electronic computer determines the need for a gear ratio change. Input data used during execution of the algorithms is derived from electrical signals representing vehicle speed, engine speed, gear selector position and throttle setting. However, a more efficient control of a motor vehicle powertrain would result if additional information, such as that derived from manual control of the vehicle operator over accelerator pedal position, the time rate of its application and release, the sense of direction of the power source torque, brake pedal application and release, etc., were available as input information for use while executing the control algorithms.

The control system interprets the driver commands and automatically commands the vehicle subsystems to achieve a desirable driving characteristic. A microprocessor controller might interpret driver commands for acceleration, braking, start-up, shut-down and process the commands to determine appropriate control of an electric motor that powers the vehicle and the powertrain. Signals derived from foot brake operation can be converted for use in regeneration control, whereby dynamic energy of the vehicle normally dissipated by friction at the wheel brakes is used to drive a generator whose output is applied to and stored in batteries for later use to drive the motor.

SUMMARY OF THE INVENTION

The method according to this invention controls and limits the torque generated by a motor vehicle traction power source and also controls the gear ratio changes of a motor vehicle multiple gear ratio, automatic transmission, which drivably connects a power source to the drive wheels of the vehicle. The power source, which may be either an electric motor or an internal combustion engine having its own torque controller, is adapted to produce an output torque that is transmitted directly to the input of the transmission. Friction elements are engaged selectively to hold components of the gearset and produce the various forward, reverse and regenerative gear ratios in accordance with control logic in the form of algorithms coded for execution by a microprocessor onboard the vehicle.

The control algorithms require continually updated values for operating variables, some of which relate to commands made by the vehicle operator, some are variables that represent current operation of the powertrain, others are commanded variables that represent future operation consistent with the operator commands. The logic embodied in the control algorithms produces updated command variables, generally resulting from Boolean expressions that combine the values of variables whose values determine the need to change or maintain the operating state of the transmission. The logic defines the possible states to which the system can be changed from its current state and directs a change of state from the current state depending on the value of the logic expressions. Certain state changes require the engagement and disengagement of transmission friction elements. Other state changes occur while maintaining the gearset condition unchanged by varying the directional sense of torque produced by the power source.

The input variables resulting from operator action include ignition key position, gear selector position and accelerator pedal position and release rate. Upshift and downshift command signals result from input representing vehicle speed, current gear ratio, accelerator pedal position and stored data that define boundaries between first and second gear operation zones defined by power source torque and speed.

BRIEF/DESCRIPTION OF THE DRAWINGS

Figure 4A:
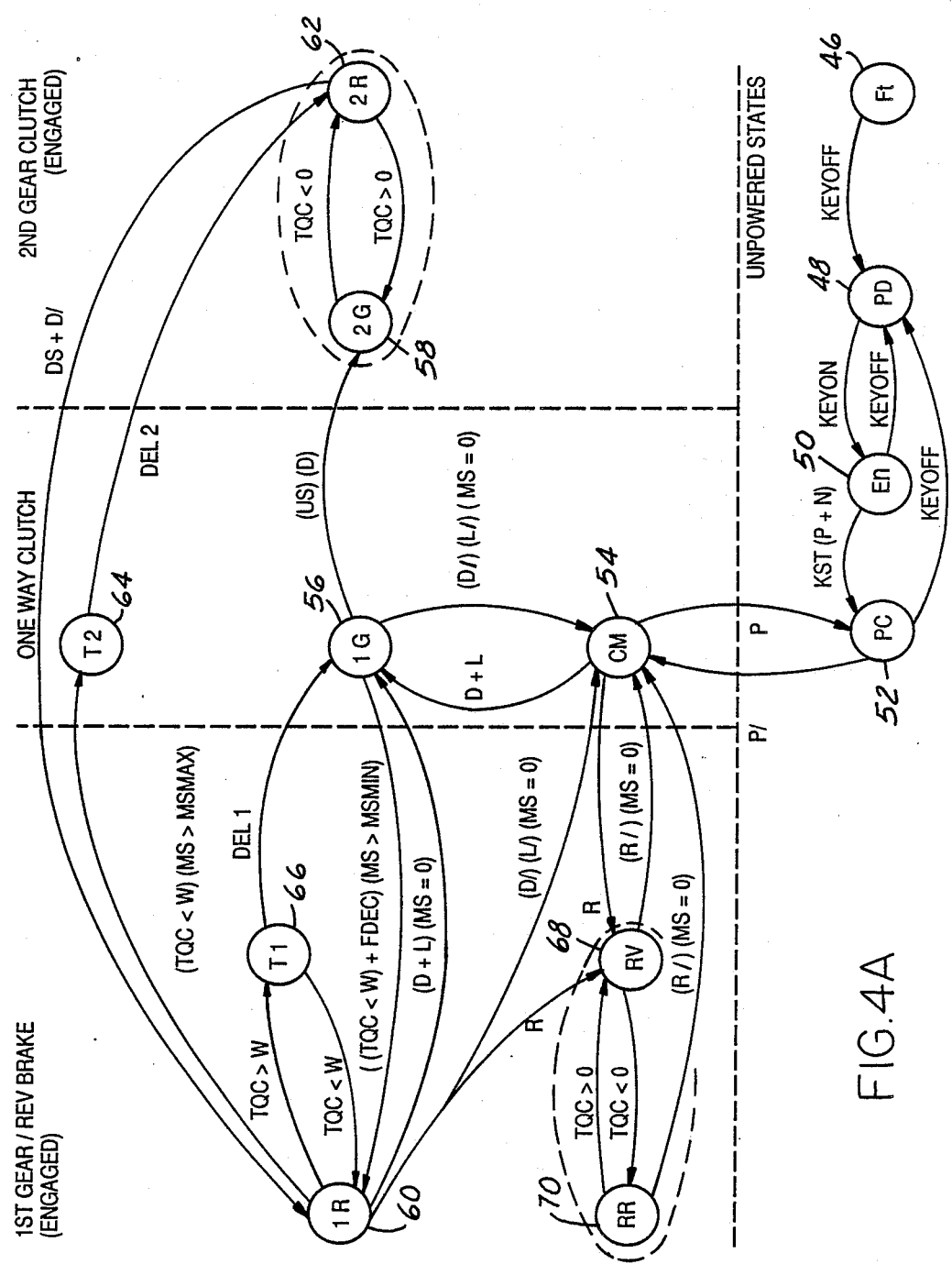
FIG. 4A is a state diagram showing the strategies of control on which the control algorithms of this invention operate.

FIG. 4B defines the variables of the state diagram of FIG. 4A.

Figure 5:
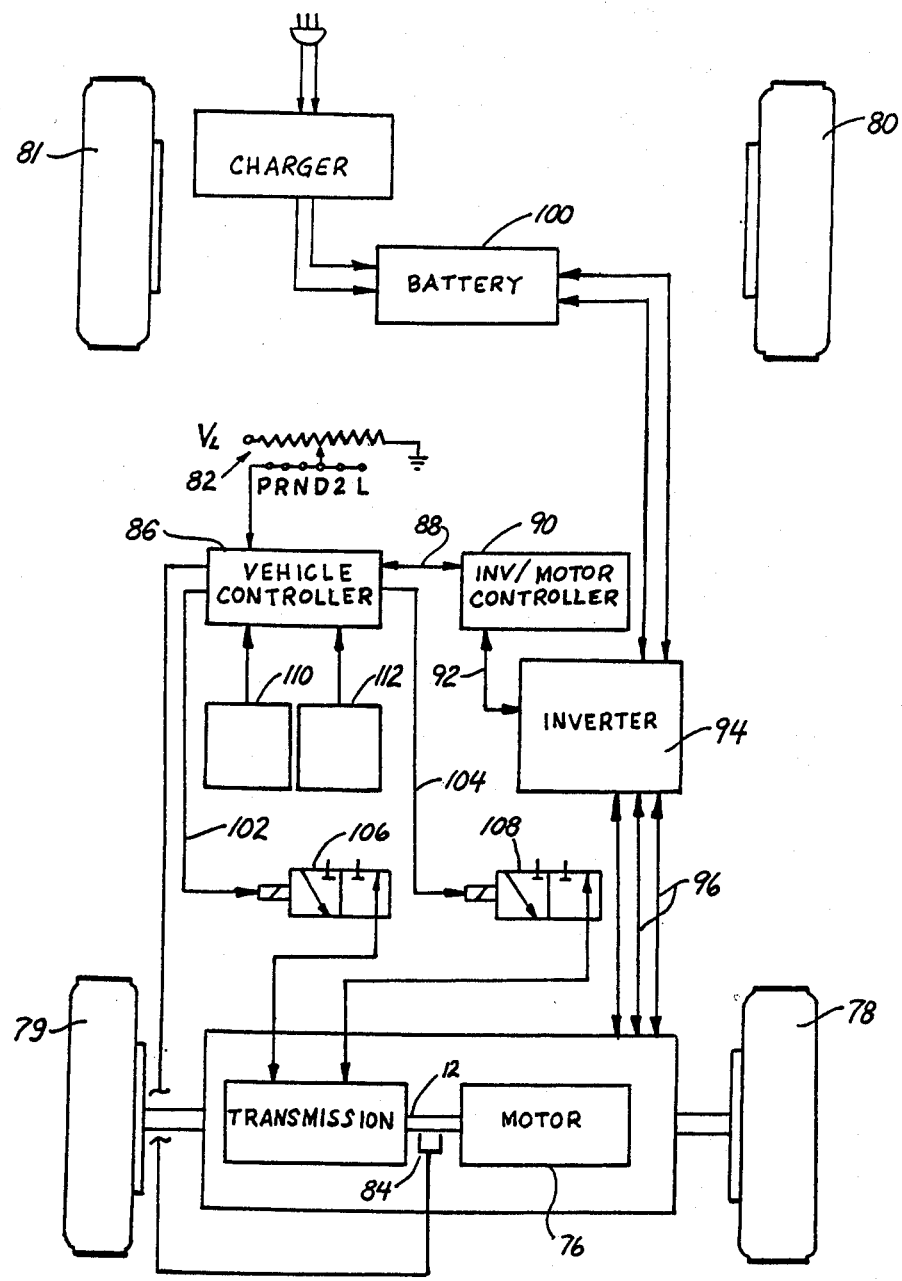

FIG. 5 is a schematic diagram showing the mechanical components of the vehicle powertrain and components of a system that electronically controls operation of the powertrain.

DESCRIPTION OF THE PREFERRED EMBODIMENT

Figure 1:
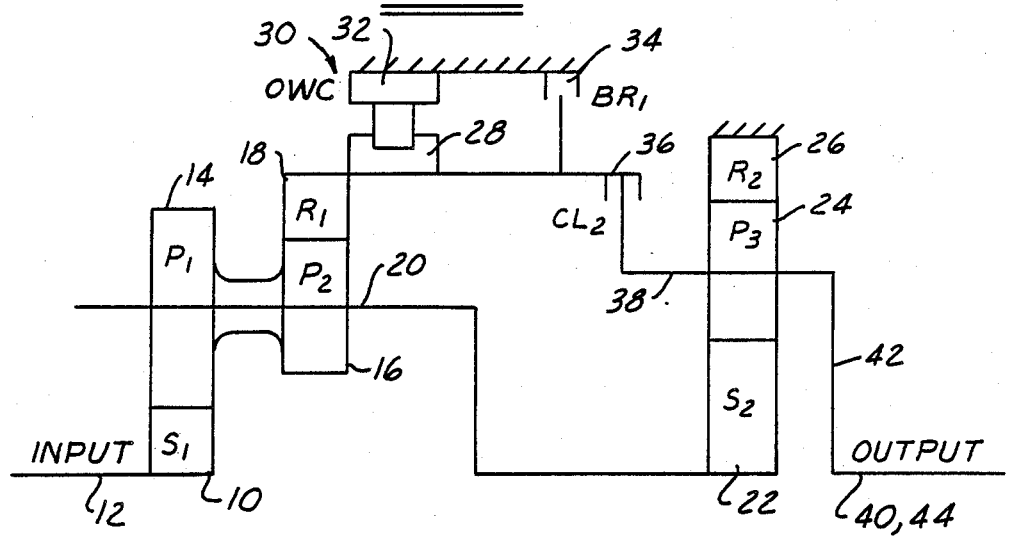
FIG. 1 shows schematically the principle components of a multiple speed planetary gearset transmission capable of being controlled by the method of this invention.

Referring first to FIG. 1, a two-speed planetary automatic transmission controlled by the method of this invention has a first stage that includes sun gear 10, which is driven through an input shaft 12 from a power source, either an internal combustion engine or an electric motor. A first set of planetary pinions 14 is in continuous meshing engagement with the sun gear and is formed integrally with a second set of planetary pinions 16, which is continuously engaged with the teeth of a ring gear 18. These planetary pinion sets are rotatably supported on a first stage carrier 20, through which power is transmitted to a second sun gear 22, a component of a second stage planetary gear set that includes a set of planetary pinions 24, which are continuously engaged with sun gear 22 and a second stage ring gear 26.

Ring gear 18 is connected to the inner driver element 28 of an overrunning or one-way clutch 30, whose outer driven element 32 is secured against rotation to the transmission casing. Ring gear 18 is also connected to a hydraulically actuated friction disc brake 34, which is fixed to the transmission casing and operates to produce reverse drive, hill braking, low gear and regenerative braking. When brake 34 is applied, ring gear 18 is fixed to the transmission casing against rotation. Hydraulically actuated friction clutch, the second or high gear clutch 36, operates to connect ring gear 18 to the carrier 38 of the second planetary stage.

Ring gear 26 is permanently fixed against rotation by attachment to the transmission casing. Pinion carrier 38 drives the bevel pinion shaft 42 in rotation about the central axis of the transmission, and the differential mechanism transmits power to drive shafts 40, 44, through which power is transmitted to the drive wheels of the vehicle.

To produce the first forward ratio drive, neither brake 34 nor clutch 36 is engaged. Instead, inner race or driving member 28 of overrunning clutch 30 transmits torque to the outer race 32, thus fixing ring gear 18 against rotation by the connection between the inner race and the outer race to the transmission casing. Pinion carrier 20, the driven member of the first stage, transmits power to the second sun gear 22. The second planetary stage has its ring gear 26 permanently fixed against rotation; therefore, the planetary pinion carrier 38 is the driven element of the second stage. The bevel pinion shaft 42 of the differential mechanism rotates about the central axis of the transmission as carrier 38 rotates.

The second or high-speed ratio results when clutch 36 is engaged and brake 34 is disengaged. When this occurs, overrunning clutch 30 does not lock ring gear 18 to the transmission casing, but rather connects ring gear 18 to pinion carrier 38 due to the one way drive through clutch 30. The first stage pinion carrier 20 is permanently connected to sun gear 22. The torque delivery path for high-speed ratio operation includes first sun gear 10, which is driven by the power source through input shaft 12; planet pinions 14; first planet pinion carrier 20, which drives second sun gear 22; and first ring gear 18, which is drivable connected by clutch 36 to second planet pinion carrier 38. Second ring gear 26, which is fixed to the transmission casing, provides the torque reaction point for the transmission in high gear. Pinion carrier 38 drives the bevel pinion shaft 42 in rotation about the central axis of the transmission, and the differential mechanism transmits power to the drive shafts 40, 44.

Reverse drive results when the rotational direction of input shaft 12 is reversed, e.g. by changing the rotation of an electric motor power source or through operation of a reverse gearset located between shaft 20 and an internal combustion engine power source, and reverse brake 34 is applied. When the direction of the input shaft is reversed, one-way clutch 30 overruns but first ring gear 18 remains fixed against rotation because brake 34 is engaged and fixes ring gear 18 to the transmission casing. In reverse drive operation, the torque delivery path is identical to that for the lowest ratio forward speed drive previously described. Input shaft 12 drives sun gear 10, pinion sets 14, 16 turn on ring gear 18, and first planetary carrier 20 drives second sun gear 22. The first and second ring gears 18, 26 are fixed against rotation to provide torque reaction points for the transmission. Output power is transmitted by the second planetary carrier 38 to bevel pinion shaft 42, which transmits power to the drive shafts through the differential mechanism.

Figure 2:
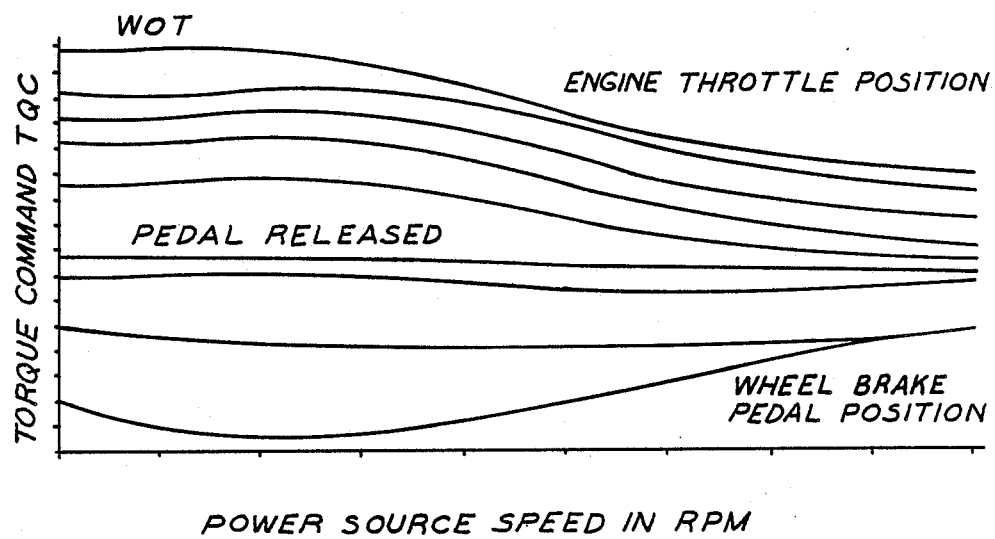
FIG. 2 is a graph showing the relationship between the speed of the power source and the torque command as a function of the accelerator pedal or throttle position and as a function of hydraulic pressure in the wheel brake system.

The position of the accelerator pedal operated manually by the driver of the vehicle is converted to a torque command through the execution of an algorithm stored in computer memory and accessible to a microprocessor located on board the vehicle. The algorithm produces a torque command TQC signal represented graphically by the function shown in FIG. 2. This function is characteristic of a powertrain that includes an internal combustion engine and represents the effect of the engine throttle position air-fuel mixture, spark timing or similar means used to control engine performance in accordance with accelerator pedal position. When the power source is an electric motor, the function simulates the relation among engine speed, output torque and accelerator pedal position for an internal combustion engine by executing the control algorithm.

In an electric vehicle the dynamic energy of the vehicle is transmitted from the wheels through the transmission to the power source, is used to drive an electric generator, is converted to produce electric energy, and is then stored in the traction batteries. Simulated compression deceleration of the vehicle also results from sensing the operator's manual control over the accelerator pedal, recovering the vehicle dynamic energy by this regeneration process and storing the recovered energy in the batteries.

Figures 3A, 3B:
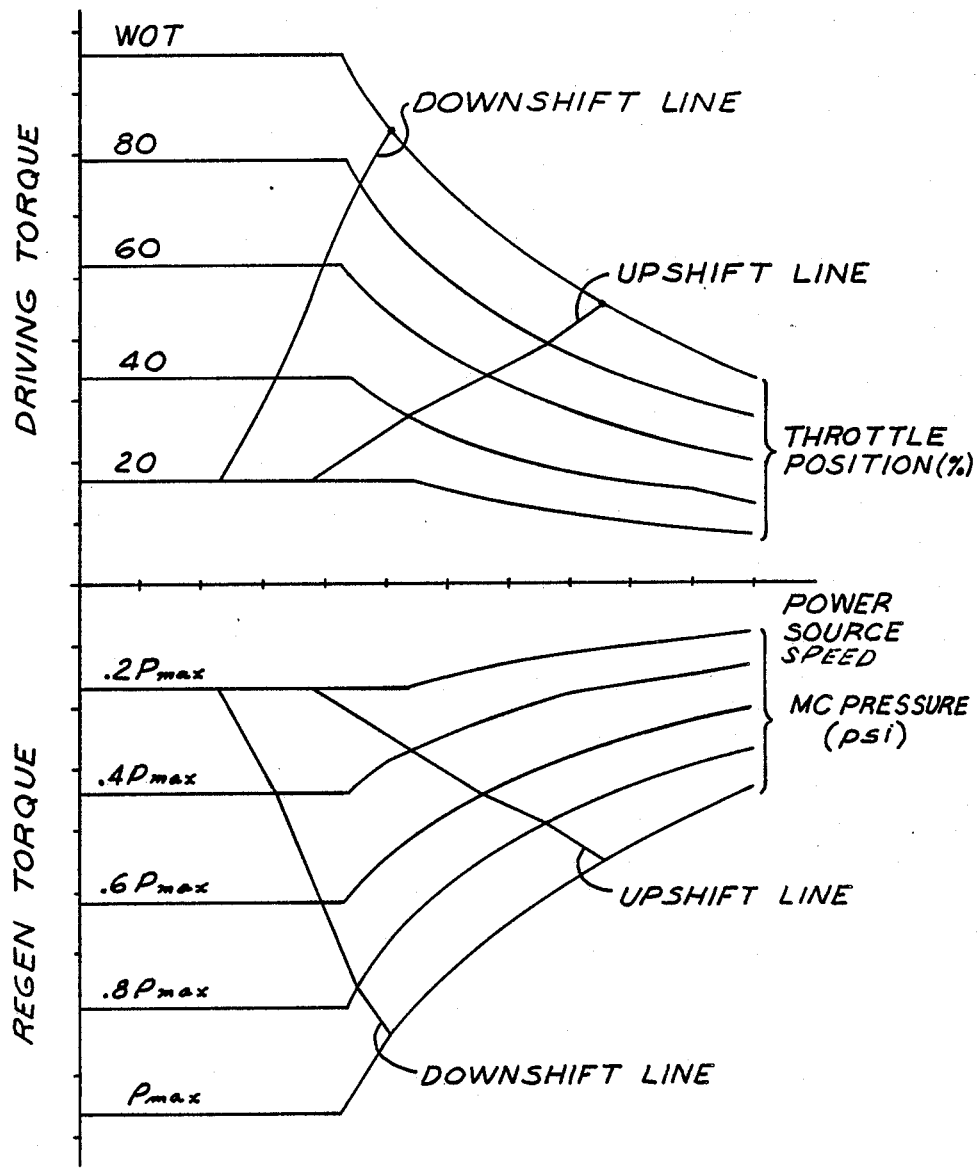
FIGS. 3A and 3B are graphs of the relationship between torque and power source speed for various throttle positions and brake pressures, respectively. The graphs include lines that indicate the occurrence of upshift and downshift command signals.

The algorithm also relates the power source speed to the hydraulic pressure in the wheel brake system and produces a torque command in accordance with that relationship, as shown in FIG. 3A.

On the basis of current power source speed and the torque command, an algorithm also produces a command for a downshift DS from a higher speed ratio to a lower speed ratio and an upshift command US from a lower speed ratio to a higher speed ratio. The commands result upon execution of an algorithm for which the current operating gear ratio, power source speed and commanded torque are input information; to which the schedules of FIGS. 3A and 3B are accessible from computer memory; and from which the DS and US commands are produced in accordance with the zone of the schedules in which the system is operating. For example, if the speed and torque command locate the operating point on the right-hand side of the upshift line, an upshift command results. If that point is on the left-hand side of the downshift line, a downshift command results. If the point is located between the upshift and downshift lines, no shift command results. FIG. 3B shows the regenerative shift schedule wherein the command torque is negative.

Another component of the torque command is that which occurs when the driver selects, through manual control of the gear selector position, a vehicle direction which is opposite that of the current vehicle direction. This component is always a decelerating torque.

FIG. 5 shows components of the powertrain that transmit torque between the motor 76 and vehicle wheels 78–71; sensors that produce signals representing various operating variables of the powertrain; and controllers that receive sensor signals, process information, and produce output signals to control the powertrain. A gear selector sensor 82 produces a signal whose magnitude represents each of the positions (PRND2L) among which the vehicle operator can manually move a transmission gear selector lever. A shaft speed sensor 84, located on input shaft 12, produces and electric signal MS representing the shaft speed, which is supplied as input to a programmable vehicle controller 86. Signal TQC representing torque commanded as output from the powertrain issue from controller 86 on line 88 to the motor controller 90. These command signals represent both positive and negative TQC commands. They are processed by controller 90 to produce control output on line 92 to converter 94, whose output on lines 96 controls torque produced by motor 76, or switch the motor to regenerative operation to recover kinetic energy from the driven wheels, convert this to electric energy carried on lines 96, 98 to battery 100, where it is stored.

Vehicle controller 86 has, stored in electronic memory accessible to its central processing unit and microprocessor, the shift schedule of FIGS. 3A and 3B. Upshift US and downshift DS commands issue from controller 86 on lines 102, 104 on the basis of the motor speed, the current transmission speed ratio and the commanded torque. These gear shift signals are applied to the solenoids of shift valves 106, 108 which pressurize and vent friction clutch 36 and friction brake 34 to produce two forward drive transmission gear ratios and reverse drive.

A null state is an internal state of the vehicle controller provided to produce a delay, but no signal issues from the controller during the null delay. A first predetermined torque W and a minimum motor speed MSMIN are stored as constants in memory accessible to controller 86. These constants are compared repetitively to TQC and MS, respectively.

Accelerator pedal sensor 110 and brake pedal sensor 112 produce signals representing their location in a range of movement between full depressed and released. These signals are sampled repetitively at high speed so that their time rate of change (FDEC) is available to controller for use in producing and issuing control commands.

The control system selects between the forward drive and reverse drive ratios as a function of the power source speed, accelerator pedal position, which is a driver torque request, and the current gear selector position. The gear ratio selection process is illustrated in state form in FIG. 4 and is accomplished in a separate software task implemented in finite state automata form in the vehicle control.

Referring now to the vehicle system state diagram of FIG. 4, notice that the diagram is divided into four sectors. Below the dashed horizontal line are the unpowered states. Above the horizontal line of the left-hand side of the diagram are the states produced when brake 34 is engaged and the vehicle is in reverse or regenerative mode. Above the line at the right-hand side of the diagram are the states that result when clutch 36 alone is engaged, and between those sectors are the states that result when neither brake 34 nor clutch 36 are engaged. The states of the system are represented by circles within which a code representing the state is printed. Connecting the states are labeled arrow-headed lines. The labels identify the excitation variables for the state to which the arrowheads point; the response variables for that state are identified by labels adjacent lines having arrowheads directed away from the state. The condition of the excitation variable, i.e. the truth or falsity of the logical expression by means of which the variables are combined, determines whether the system moves from its current operating state. The logical flow represented by the lines that connect the various states determines the next state to which the system moves when the corresponding excitation or response variable is true. When all of the response variables of the current state are false, the system remains in the current state.

The control strategy begins with the system in power down state 48 from which it can move to the enable state 50 by key-on. When a signal representing the ignition key ON condition is present while in the enabled state, a microprocessor having its own power source initializes the system variables. If the ignition key is turned OFF while in state 50, the system returns to state 48 and awaits the key ON condition before any further action occurs. Otherwise, the system remains at state 50 until the response from that condition KST (P+N) becomes true, i.e. until the ignition key is moved to the start position KST and the gear selector is moved to position P or position N. When this condition is satisfied, the system moves to state 52, the precharge PC state. In the precharge state, filter capacitors in an inverter, which operates to avoid voltage ripple, are precharged. If while in the state 52, the ignition key is turned OFF, the system returns to state 48 where it remains until the ignition key is once again turned ON.

From precharge state 52 the system moves to the close main contractor CM state 54 if the gear selector is moved to any position other than the P position, i.e. if the gear selector position is P/. In a vehicle powered by an electric motor, state 54 is comparable to an idle condition with the gear selector in the park P or neutral N position and where the drive train is powered by an internal combustion engine.

The system moves to the one-way clutch 1G state 56 when the gear selector is moved to the drive D or low L position. The system returns to state 54 from state 56 if the gear selector is not located at the D position and not located at the L position and the motor speed is equal to zero. In state 56 the transmission operates at the low forward speed ratio.

From state 56 an upshift can be made to the second gear motoring 2G state 58 or to the first gear regeneration 1R state 60. When the upshift signal US is present and the gear selector is located at D, an upshift is made to the second gear clutch state 58. If the torque command signal becomes negative while the system is in state 58, the system moves to second gear regeneration 2R state 62, but it can return to state 58 whenever the torque command becomes positive. The system can cycle between states 58 and 62 without a gear ratio change by maintaining clutch 36 engaged and cycling between a positive and a negative torque command. In state 62 the power train and power source recover energy input to the system through the drive wheels, whereas in states 56, 58, the power train supplies energy to the drive wheels from the power source.

A downshift occurs from state 62 to the first regeneration 1R state 60 provided the downshift DS signal is present or the gear selector is located in a position other than the D position. In state 60 also the drive train recovers power supplied from the drive wheels through the transmission, while in the first gear ratio, to the power source. Power then is converted to electric energy by a generator from which the traction batteries are charged. The brake clutch 34 is disengaged when the gear selector is in drive or low and the motor speed is zero with the system moving from state 60 to state 56.

The system can move from the first gear regeneration state 60 to the second gear regeneration state 62 by passing through null state 64. A null state is a state wherein no operational chamge of the system occurs from that of the state of the system immediately before entering the null state. The system can return to the previous state from the null state immediately, or the system can advance to another state after a delay. The change from state 60 to 64 occurs provided two conditions are present: (i) a constant small positive torque W, i.e., a positive constant whose magnitude is set to avoid excessively frequent shifts between regeneration states 60, 62 and between regeneration state 60 and first gear drive state 56, must exceed the torque command TQC, either driving torque or regeneration torque, and (ii) the motor speed signal must be greater than the maximum allowable motor speed signal. When both of these conditions are true, brake 34 is disengaged, thereby connecting ring gear 18 to ground solely through one-way clutch 30. Thereafter, clutch 36 is applied to move the system from state 64 back to state 62 at the conclusion of a time delay DEL 2, whose length is predetermined and whose expiration is determined by clocking means present within the computer control system.

Alternatively, the change from state 60 to state 56 occurs by passing through null state 66. The system moves from state 60 to null state 66 when the torque command exceeds the constant W value. Thereafter, following time delay DEL 1, the system moves from state 66 to 56. A return to state 60 from null state 66 occurs if the torque command falls below constant positive torque W. The time delay DEL 1 is imposed to avoid high frequency oscillations associated with changing the power flow between one-way clutch 30 and brake 34. In moving from state 66 to state 56, brake 34 is released so that first gear ratio occurs with neither the friction brake 34 nor friction clutch 36 engaged, but only through operation of overrunning clutch 30.

Another possibility for exiting state 60 and returning to state 56, thereby avoiding the delay at null state 66, results when the gear selector is in the D or L position and the motor speed is equal to zero. In making this transition brake 34 is released through operation of solenoid-operated hydraulic valves controlled through execution of an algorithm stored in computer memory accessible to the logic unit of the microprocessor.

Means is available to exit state 60 and move directly to state 54, the neutral state, provided the gear selector is not in either the D or L position and motor speed is equal to zero.

If while in state 60, the gear selector is moved to the R position, the system moves directly to reverse clutch RV state 68. In making this transition in a system employing an electric motor power source, the output of the motor is reversed and negative torque is produced in response to a signal applied to the motor control representing a need for negative torque. The same effect could occur in a power train driven by an internal combustion engine by actuating a clutch whose engagement directs power from the input shaft 12 through a reversing gear set located between the engine output and the input shaft.

From state 68 the system can return to neutral state 54 or it can move to the reverse gear regeneration RR state 70. While in state 70 the response to a positive torque command causes a return to state 68. In response to a negative torque command, the system moves from state 68 to the reverse/regeneration state 70. The system moves from state 70 or state 68 to the neutral state 54 provided the gear shift selector is not in the R position and the motor speed signal is equal to zero. The system produces a change from the neutral state 54 to reverse state 68 when the gear selector is moved to the R position.

When the transmission is disposed for operation in the lower gear ratio and the central system is in state 56, a change directly to the reverse drive ratio state 60, will occur if the torque command is less than the constant torque W or a minimum rate of accelerator pedal release signal is present, provided however that when either of those conditions is true the motor speed signal must also exceed a predetermined minimum motor speed signal. When making the shift from the first gear ratio to the reverse drive direction this latter condition assures that sufficient energy is available for recovery through regeneration to justify engagement of the reverse/regeneration brake 34.

Having described a preferred embodiment of our invention, what we claim and desire to secure by U.S. Letters Patent is:

1. A method for controlling the operation of a automotive vehicle powertrain system, which includes a power source, a multiple speed ratio transmission, selectively engageable and disengageable friction elements, comprising:
   producing signals representing the position of a gear selector located at park P, neutral N, forward drive D and low speed forward drive L positions, the torque TQC commanded, and the speed MS of the power source;
   producing an upshift command US and a downshift command DS in accordance with the current operating speed ratio, the speed of the power source and the torque represented by the torque command signal;
   changing the state of the system to a first forward speed ratio state from a neutral state by moving the gear selector to a forward drive position;
   changing the state of the system from the first speed ratio to the second speed ratio by operating the friction elements to upshift the transmission, provided the upshift command is present and gear selector is in the D position;
   changing the state of the system from the second speed ratio state to a second speed regenerative state, provided the torque represented by the torque command signal is negative;
   changing the state of the system from the second speed regenerative state to a first speed regenerative state provided the downshift signal is present or the gear selector is not at the D position; and
   changing the state of the system from the first speed regenerative state to the first gear state, provided the gear selector is in the D or L position and the power source speed signal represents substantially zero speed.

2. The method of claim 1 further comprising changing the state of the system from the second speed regenerative state to the second gear state, provided the torque command represented by the torque signal is positive.

3. The method of claim 1 further comprising operating the friction elements to change the state of the system from the first speed regenerative state to the reverse drive state, provided the gear selector is in the R position.

4. The method of claim 1 further comprising operating the friction elements to change the state of the system from the first speed regenerative state to the neutral state, provided the gear selector is not at the D position or the L position and the power source speed represents substantially zero speed.

5. The method of claim 1 further comprising;
defining a first predetermined torque signal;
changing the state of the system from the first speed regenerative state to a first null state, provided the torque represented by the torque/signal is greater than said first predetermined torque;
beginning a first delay period; and
changing the state of the system from the first null state to the first gear state upon expiration of the first delay period.

6. The method of claim 5 further comprising changing the state of the system from the first null state to first regenerative state, provided the torque command signal does not exceed the predetermined torque signal.

7. The method of claim 1 further comprising:
producing signals representing the rate of release FDEC of a manually operated accelerator pedal and a minimum power source speed MSMIN and;
operating the friction elements to change the state of the system from the first gear state to the first speed regenerative state, provided the following condition is true $((TQC<W)+FDEC)(MS>MSMIN)$.

8. The method of claim 1 further comprising operating the friction elements to change the state of the system from the regeneration first speed ratio state to the neutral state, provided the following condition is true $(D/)(L/)(MS=0)$.

9. The method of claim 1 further comprising;
changing the state of the system from the first speed regenerative state to a second null state, provided the following condition is true $(TQC<W)(MS>MSMAX)$;
beginning a second delay period; and
changing the state of the system from the second null state to the second speed regenerative state upon expiration of the second delay period.

10. The method of claim 1 further comprising changing the state of the system from the reverse drive state to a reverse regenerative state, provided the torque command signal is negative.

11. The method of claim 3 further comprising changing the state of the system from the reverse regenerative state to the reverse drive state, provided the torque command signal is positive.

12. The method of claim 3 further comprising operating the friction elements to change the state of the system from the reverse drive state to the neutral state, provided the following condition is true $(R/)(MS=0)$.

13. The method of claim 12 further comprising operating the friction elements to change the state of the system from the neutral state to the reverse drive state if the gear selector is in the R position.

14. The method of claim 3 further comprising operating the friction elements to change the state of the system from the reverse regenerative state to the neutral state, provided the following condition is true $(R/)(MS=0)$.

* * * * *